United States Patent
Daley et al.

(10) Patent No.: US 10,618,516 B2
(45) Date of Patent: Apr. 14, 2020

(54) AUTOMOTIVE VEHICLE WITH CRUISE CONTROL THAT ENHANCES FUEL ECONOMY

(71) Applicants: James J Daley, Jackson, MI (US); Joseph M Dekar, Jackson, MI (US); Roger C Sager, Munith, MI (US); Brian L Terwedo, Okemos, MI (US); Gregg T Black, Livonia, MI (US)

(72) Inventors: James J Daley, Jackson, MI (US); Joseph M Dekar, Jackson, MI (US); Roger C Sager, Munith, MI (US); Brian L Terwedo, Okemos, MI (US); Gregg T Black, Livonia, MI (US)

(73) Assignee: FCA US LLC, Auburn Hills, MI (US)

( * ) Notice: Subject to any disclaimer, the term of this patent is extended or adjusted under 35 U.S.C. 154(b) by 222 days.

(21) Appl. No.: 15/685,122

(22) Filed: Aug. 24, 2017

(65) Prior Publication Data
US 2019/0061528 A1 Feb. 28, 2019

(51) Int. Cl.
| B60W 30/14 | (2006.01) |
| B60K 31/04 | (2006.01) |
| B60K 31/00 | (2006.01) |
| B60W 50/00 | (2006.01) |

(52) U.S. Cl.
CPC ......... *B60W 30/143* (2013.01); *B60K 31/047* (2013.01); *B60W 30/14* (2013.01); *B60W 30/146* (2013.01); *B60K 2031/0091* (2013.01); *B60K 2310/244* (2013.01); *B60K 2310/30* (2013.01); *B60T 2201/02* (2013.01); *B60W 2050/0095* (2013.01); *B60W 2520/10* (2013.01); *F02D 2200/501* (2013.01); *F02D 2200/606* (2013.01)

(58) Field of Classification Search
CPC .. B60W 30/143; B60W 30/14; B60W 30/146; B60K 31/047; B60K 2310/244; B60K 2031/0091; B60K 2310/30; B60T 2201/02; F02D 2200/606; F02D 2200/501
See application file for complete search history.

(56) References Cited

U.S. PATENT DOCUMENTS

| 6,470,256 B1 | 10/2002 | Cikalo et al. |
| 6,830,121 B1 * | 12/2004 | Johnson .............. F02D 41/0007 180/170 |
| 8,954,255 B1 | 2/2015 | Crawford |
| 2010/0049400 A1 * | 2/2010 | Duraiswamy et al. ...................... B60W 30/143 701/123 |
| 2011/0276216 A1 * | 11/2011 | Vaughan ............. B60W 30/143 701/31.4 |

(Continued)

OTHER PUBLICATIONS

Nystrom, Lynn A. "Future Cruise Control to Have Environmental, Safety Features", Virginia Tech College of Engineering, Feb. 26, 2013.

(Continued)

*Primary Examiner* — Dale W Hilgendorf
(74) *Attorney, Agent, or Firm* — Ralph E Smith

(57) ABSTRACT

In accordance with an aspect of the present disclosure, cruise control of an automotive vehicle in a fuel economy cruise control mode controls vehicle speed to be within a fuel economy speed band about a cruise control set speed so that instantaneous fuel economy is at least equal to average fuel economy.

2 Claims, 2 Drawing Sheets

(56) References Cited

U.S. PATENT DOCUMENTS

| | | | |
|---|---|---|---|
| 2011/0313647 A1* | 12/2011 | Koebler et al. | B60W 30/143 701/123 |
| 2013/0035837 A1* | 2/2013 | Johansson et al. | B60W 30/143 701/98 |
| 2013/0158829 A1* | 6/2013 | Schumann | B60W 2540/02 701/93 |
| 2014/0163798 A1* | 6/2014 | Ross | B60W 30/00 701/93 |
| 2017/0291605 A1* | 10/2017 | Grewal et al. | B60W 30/143 |
| 2018/0065481 A1* | 3/2018 | Morisset et al. | B60W 30/143 |

OTHER PUBLICATIONS

Roberts, Jack, "Modern Cruise Control Coming of Age and What it Means for Your Fleet and Drivers", CCJ Commercial Carrier Journal—Fleet Management Magazine, www.ccjdigital.com/modern-cruise-control-coming-of-age-and-what-it-rneans-for-your-fleet-and-drivers/, Dec. 3. 2015.

Hsu, Jeremy, "Smarter Cruise Control Can Boost Hybrid Fuel Economy and Safety", IEEE Spectrum, Jan. 14, 2016.

* cited by examiner

AUTOMOTIVE VEHICLE WITH CRUISE CONTROL THAT ENHANCES FUEL ECONOMY

FIELD

The present invention relates to an automotive vehicle with cruise control, and more particularly, to cruise control with a control strategy that enhances fuel economy.

BACKGROUND

Automotive vehicles often have cruise control. Basic cruise control automatically controls vehicle speed to be within a speed band about a set cruise control speed, which is typically set for a driver. An example of a speed band is +/− 1 mile per hour. Adaptive cruise control also automatically controls vehicle speed to be within the speed band about the set cruise control speed but will automatically slow the vehicle speed to maintain at least a predetermined distance from a preceding vehicle that the vehicle is behind. In each case, the cruise control typically has predetermined acceleration and deceleration rates at which it accelerates or decelerates the vehicle to maintain vehicle speed within the speed band. These rates are referred to herein as regular cruise control acceleration and deceleration rates.

SUMMARY

In accordance with an aspect of the present disclosure, cruise control in an automotive vehicle having an engine is controlled with an electronic control unit. The electronic control unit is configured to determine whether vehicle speed is within a fuel economy speed band about a cruise control set speed. The electronic control is also configured to control cruise control in a fuel economy cruise control mode when vehicle speed is within the fuel economy speed band and control cruise control in a regular cruise control mode when vehicle speed is outside the fuel economy speed band to bring the vehicle speed to within the fuel economy speed band and then transitioning to controlling cruise control with the electronic control unit in the fuel economy cruise control mode when the vehicle speed is within the fuel economy speed band. When controlling cruise control in the fuel economy cruise control mode, the electronic control unit is configured to control the engine so that an instant fuel economy of the vehicle is greater than or equal to an average fuel economy of the vehicle.

In an aspect, the electronic control unit is configured to determine if the vehicle speed has been below the cruise control set speed for more than a predetermined period of time when controlling the cruise control in the fuel economy cruise control mode. Upon determining that the vehicle speed has been below the cruise control set speed for more than the predetermined period of time, the electronic control unit is configured to accelerate the vehicle at a fuel economy cruise control acceleration rate that is a predetermined amount lower than a regular cruise control acceleration rate.

BRIEF DESCRIPTION OF THE DRAWINGS

The present invention will become more fully understood from the detailed description and the accompanying drawings, wherein.

DETAILED DESCRIPTION

Figure 1:
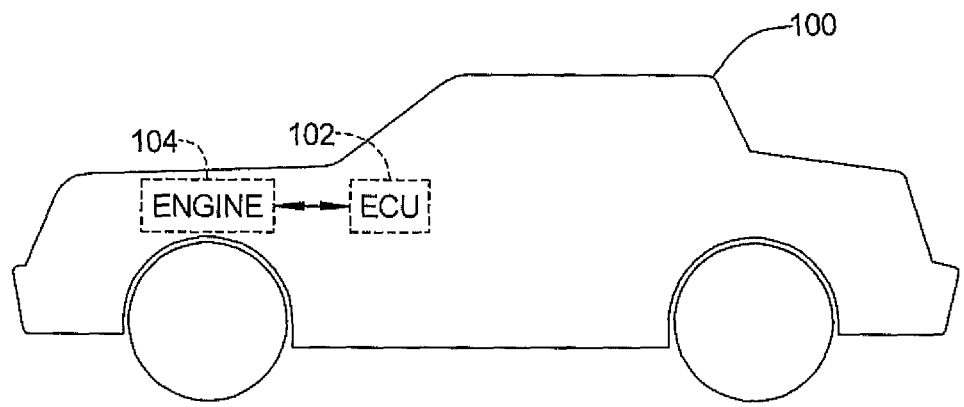
FIG. 1 is a simplified block diagram of an automotive vehicle having cruise control enhanced for fuel economy in accordance with an aspect of the present disclosure.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

In accordance with an aspect of the present disclosure, a control methodology for controlling cruise control of an automotive vehicle in a fuel economy cruise control mode controls vehicle speed to be within a fuel economy speed band about a cruise control set speed and so that instantaneous fuel economy at least equal to average fuel economy. In controlling the vehicle speed, the control methodology uses a fuel economy acceleration rate to accelerate the vehicle when the vehicle speed needs to be increased, which is a lower acceleration rate than the regular cruise control acceleration rate typically used in cruise control, as discussed above. In an aspect, the cruise control methodology uses the regular cruise control acceleration rate to accelerate the vehicle when the vehicle speed has fallen below a lower limit of the speed band until the vehicle speed has increased to be within the fuel economy speed band. In an aspect, the cruise control methodology uses the regular cruise control deceleration rate to decelerate the vehicle when the vehicle speed has increased above an upper limit of the fuel economy speed band until the vehicle speed has decreased to be within the fuel economy speed band. In an aspect, the fuel economy speed band is at least three times a speed band of regular cruise control. For example, if the speed band of regular cruise control is +/− 1 MPH around the cruise control set speed, then the fuel economy speed band is at least +/− 3 MPH.

FIG. 1 is a simplified diagram of an automotive vehicle 100 having an electronic control unit 102 that includes control logic for controlling cruise control in a fuel economy cruise control mode in accordance with an aspect of the present disclosure, such as software programmed in electronic control unit 102. In an aspect, the electronic control unit controls an engine 104 of vehicle 100 and includes control logic for doing so, such as software programmed in electronic control unit 102.

Figure 2:
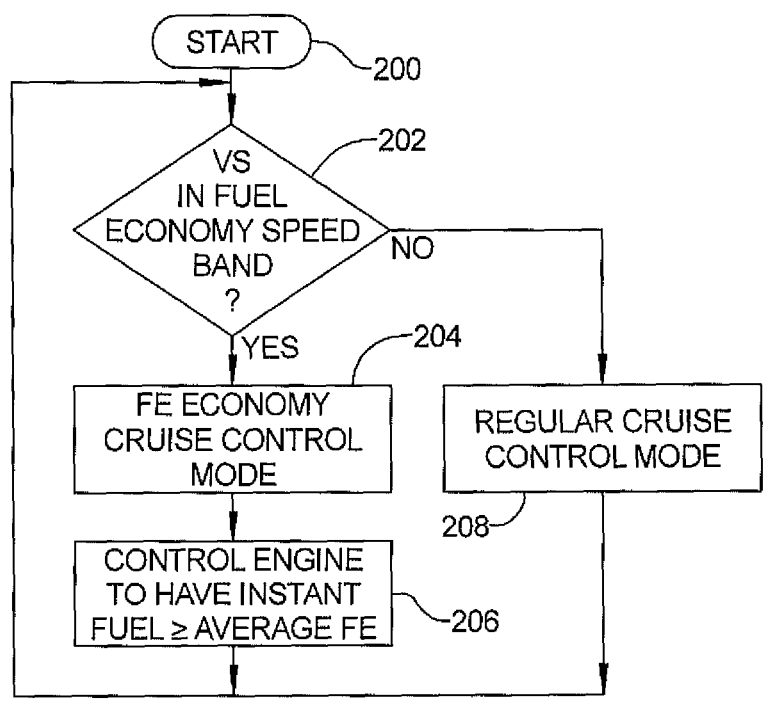
FIG. 2 is a flow chart of an illustrative basic control routine for controlling cruise control for enhanced fuel economy in accordance with an aspect of the present disclosure.
Figure 3:
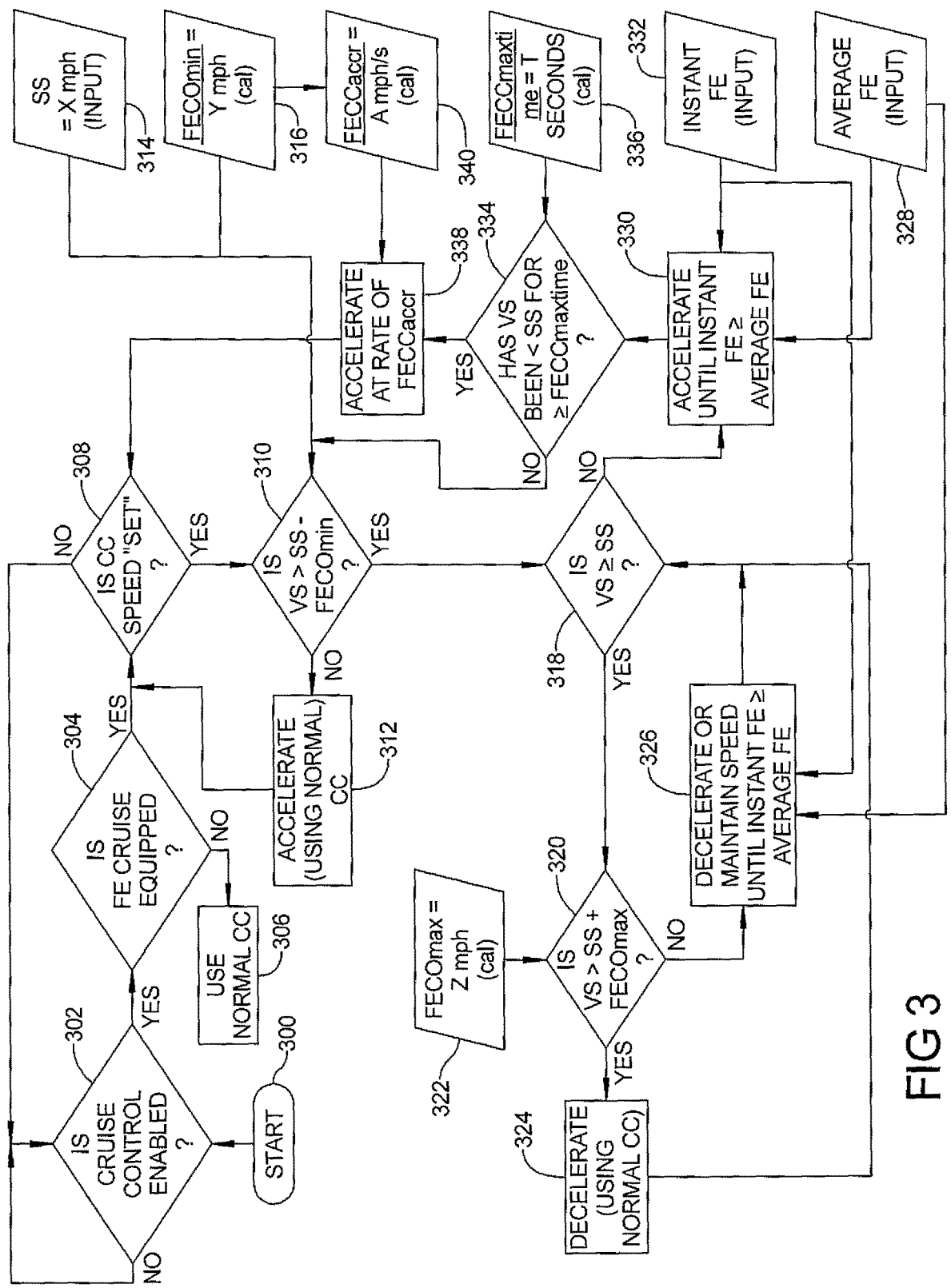
FIG. 3 is a flow chart of an illustrative more detailed control routine for controlling cruise control for enhanced fuel economy in accordance with an aspect of the present disclosure.

As used herein and with specific reference to FIGS. 2 and 3, the following abbreviations are used:
  CC cruise control;
  FE fuel economy;
  MPH miles per hour;
  VS vehicle speed;
  SS set cruise control speed;

FECOmin minimum vehicle speed threshold below the set cruise control speed (calibrated setting, such as in MPH);

FECOmax maximum vehicle speed threshold above the set cruise control speed (calibrated setting, such as in MPH);

FECCaccr target acceleration rate when in FE Cruise Mode (calibrated setting, such as in MPH per second);

FECCmaxtime maximum vehicle speed threshold above the set cruise control speed (calibrated setting, such as in MPH);

Instant FE instant fuel economy (pre-existing calculation made in pre-existing electronic control units that control engines);

Average FE or AVG FE average fuel economy (pre-existing calculation made in pre-existing electronic control units that control the engines);

As used herein, a "calibrated setting" is a setting that is entered into an electronic control unit, such as by a calibrator during a calibration process.

FIG. 2 is a flow chart showing of an illustrative basic control routine implemented in control logic in electronic control unit 102 for controlling cruise control of vehicle 100 in a fuel economy cruise control mode accordance with an aspect of the present disclosure. The control routine starts at 200. At 202, the control routine checks whether the vehicle speed is within a fuel economy speed band. The fuel economy speed band is defined by FECOmin and FECOmax. If at 202 the vehicle speed is found not within the fuel economy speed band, the control routine branches to 208 where regular cruise control mode is used for cruise control and the control routine branches back to 202. If at 202 the vehicle speed is within the fuel economy speed band, the control routine proceeds to 204 where the fuel economy cruise control mode is used for cruise control. The control routine then proceeds to 206 where when using fuel economy cruise control mode for cruise control, the control routine controls engine 104 of vehicle 100 so that instant fuel economy is at least equal to average fuel economy.

FIG. 3 is a flow chart of an illustrative more detailed control routine implemented in control logic in electronic control unit 102 for controlling cruise control of vehicle 100. The control routine starts at 300 and proceeds to 302 where it checks whether cruise control is enabled, such as by a driver of vehicle 100 enabling cruise control. If cruise control is not enabled, the control routine branches back to 302. If cruise control is enabled, the control routine proceeds to 304 where it checks whether vehicle 100's cruise control includes fuel economy cruise control in accordance with the present disclosure. If not, the control routine branches to 306 and normal cruise control is utilized. In an aspect, normal cruise control regulates vehicle speed to a set cruise control speed which is a speed set by a driver, typically to the set cruise control speed +/− 1 MPH. In an aspect, normal cruise control is adaptive cruise control that also regulates vehicle speed to the set cruise control speed but also slows the vehicle to maintain a predetermined distance from a vehicle in front of it.

If at 304 the control routine determines that the cruise control includes fuel economy cruise control, the control routine proceeds to 308 where it checks whether cruise control speed is set. If at 308 cruise control speed is not set, the control routine branches back to 302. If at 308 cruise control speed is set, the control routine branches to 310 where it checks whether vehicle speed (VS) is above a minimum speed threshold ($VS_{min}$) where $VS_{min}$ is the set cruise control speed (SS) from block 314 minus the minimum vehicle speed threshold ($FECO_{min}$) from block 316. The set cruise control speed (SS) is set by a driver of the vehicle, as discussed above, and stored in electronic control unit 102 when the driver sets it. $FECO_{min}$ is a calibrated setting stored in electronic control unit 102. If at 310 VS is not above the minimum speed threshold ($VS_{min}$), the control routine branches to 312 where it accelerates the engine 104 of the vehicle 100 (using an acceleration rate of normal cruise control) and then branches back to 308. If at 310 the vehicle speed (VS) is above ($VS_{min}$), the control routine proceeds to 318 where it checks whether the vehicle speed (VS) is equal to or greater than the set cruise control speed (SS). If so, the control routine proceeds to 320 where it checks whether the vehicle speed (VS) is above a maximum speed threshold ($VS_{max}$) where ($VS_{max}$) is the set cruise control speed (SS) plus the maximum vehicle speed threshold ($FECO_{max}$) from block 322. $FECO_{max}$ is a calibrated setting stored in electronic control unit 102, If (VS) is above ($VS_{max}$), the control routine branches to 324 where it decelerates engine 104 (using a deceleration rate of normal cruise control) and then branches back to 318. If at 320 (VS) is not above ($VS_{max}$), the control routine branches to 326 and decelerates engine 104 or maintains engine 104 at constant throttle, as needed, until instant fuel economy (Instant FE) from block 332 is greater than or equal to average fuel economy (Average FE) from block 328 and then branches back to 314. Average fuel economy (Average FE) and Instant fuel economy (Instant FE) are determinations known in the art and commonly used in engine control software programmed in electronic control units that control engines. The electronic control unit that controls engine 104 of the vehicle 100, such as electronic control unit 102, includes software that makes these determinations and these determinations are then used as inputs in the control methodology for fuel economy cruise control as described herein.

If at 318 the control routine determines that the vehicle speed (VS) is not greater than or equal to the set cruise control speed (SS), the control routine proceeds to 330 where it accelerates engine 104 or maintains the engine 104 at constant throttle, as needed, until instant fuel economy (Instant FE) is greater than or equal to average fuel economy (Average FE) and then proceeds to 334. At 334, the control routine checks whether vehicle speed (VS) has been greater than the set cruise control speed (SS) for a period equal to or greater than a maximum time ($FECC_{maxtime}$) obtained from block 336 that vehicle speed (VS) can be below the set cruise control speed (SS). ($FECC_{maxtime}$) is a calibrated setting stored in electronic control unit 102. If at 334 (VS) has not been less than (SS) for a period equal to or longer than ($FECC_{maxtime}$), the control routine branches back to 310. If at 334 VS has been less than (SS) for a period equal to or longer than ($FECC_{maxtime}$), the control routine proceeds to 338 where it accelerates engine 104 at a fuel economy acceleration rate ($FECC_{accr}$) from block 340. ($FECC_{accr}$) is a calibrated setting stored in electronic control unit 102 which is illustratively set to be less than a regular cruise control acceleration rate by a predetermined amount. The regular cruise control acceleration rate is the acceleration rate that the vehicle is accelerated at to bring it back to the set cruise control speed when the vehicle's speed has fallen below the set cruise control speed when cruise control is in the regular cruise control mode. The regular cruise control acceleration rate is illustratively a calibratable setting.

The foregoing fuel economy cruise control routine advantageously provides cruise control having a fuel economy cruise control mode that is implemented using existing data and inputs available in vehicles, instant fuel economy and average fuel economy in particular, without the need to have additional hardware, such as a sensor that senses the incline of a road that the vehicle is traveling, such as an inclinometer or accelerometer.

The electronic control unit such as electronic control unit 102 in which the foregoing fuel economy cruise control routine is implemented is or includes any of a digital processor (DSP), microprocessor, microcontroller, or other programmable device which are programmed with software implementing the above described methods. It should be understood that alternatively it is or includes other logic devices, such as a Field Programmable Gate Array (FPGA), a complex programmable logic device (CPLD), or application specific integrated circuit (ASIC). When it is stated that the electronic control unit 102 or the fuel economy cruise control routine implemented in electronic control unit 102 performs a function or is configured to perform a function, it should be understood that the electronic control unit 102 is configured to do so with appropriate logic (such as in software, logic devices, or a combination thereof).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of controlling cruise control in an automotive vehicle having an engine and an electronic control unit in which the electronic control unit determines an instant fuel economy of the vehicle and an average fuel economy of the vehicle, comprising:

determining with the electronic control unit whether vehicle speed is within a fuel economy speed band about a cruise control set speed and controlling cruise control with the electronic control unit in a fuel economy cruise control mode when vehicle speed is within the fuel economy speed band and controlling cruise control with the electronic control unit in a regular cruise control mode when vehicle speed is outside the fuel economy speed band to bring the vehicle speed to within the fuel economy speed band and then transitioning to controlling cruise control with the electronic control unit in the fuel economy cruise control mode when the vehicle speed is within the fuel economy speed band;

when controlling cruise control in the fuel economy cruise control mode, controlling the engine with the electronic control unit so that the instant fuel economy of the vehicle is at least the average fuel economy of the vehicle; and determining with the electronic control unit if the vehicle speed has been below the cruise control set speed for more than a predetermined period of time when controlling the cruise control in the fuel economy cruise control mode and upon determining that the vehicle speed has been below the cruise control set speed for more than the predetermined period of time then changing from controlling the engine with the electronic control unit so that the instant fuel economy of the vehicle is at least the average fuel economy of the vehicle to accelerating the vehicle at a fuel economy cruise control acceleration rate that is less than a regular cruise control acceleration rate by a predetermined amount.

2. An automotive vehicle having an engine and an electronic control unit in which the electronic control unit determines an instant fuel economy of the vehicle and an average fuel economy of the vehicle, comprising:

the electronic control unit configured with cruise control having a regular cruise control mode and a fuel economy cruise control mode;

the electronic control unit configured to determine whether vehicle speed is within a fuel economy speed band about a cruise control set speed and controlling cruise control in the fuel economy cruise control mode when vehicle speed is within the fuel economy speed band and controlling cruise control in the regular cruise control mode when vehicle speed is outside the fuel economy speed band to bring the vehicle speed to within the fuel economy speed band and then transitioning to fuel economy cruise control mode when the vehicle speed is within the fuel economy speed band;

when controlling cruise control in the fuel economy cruise control mode, the electronic control unit is configured to control the engine so that an instant fuel economy of the vehicle is at least an average fuel economy of the vehicle; and the electronic control unit is configured to determine if the vehicle speed has been below the cruise control set speed for more than a predetermined period of time when in the fuel economy cruise control mode and upon determining that the vehicle speed has been below the cruise control set speed for more than the predetermined period of time then changing from controlling the engine so that the instant fuel economy of the vehicle is at least the average fuel economy of the vehicle to accelerating the vehicle at a fuel economy cruise control acceleration rate that is less than a regular cruise control acceleration rate by a predetermined amount.

* * * * *